3,340,075
TAR-BONDED REFRACTORIES CONTAINING PINE TAR
Stuart V. Stoddard, Needham, and John F. Hardy and Porter F. Gridley, Andover, Mass., assignors to Cabot Corporation, Boston, Mass., a corporation of Delaware
No Drawing. Filed Dec. 16, 1964, Ser. No. 418,865
10 Claims. (Cl. 106—56)

This invention relates to novel carbon-containing compositions and more specifically to novel "tar-bonded refractories" comprising a particulate solid and a binder.

Compositions comprising a particulate refractory solid and a binder are well known and useful articles of commerce. Thus, compositions comprising dolomite aggregates, periclase fines and an organic binder are often "coked" in the substantial absence of oxygen to produce tar-bonded refractory materials as disclosed for example, in U.S. 3,070,499. In finished materials of this type, green strength and density are extremely important factors. It has been found, for example, that good green strength results in a minimum of damage to molded articles due to handling, transportation and the like whereas density is related to serviceability, i.e. the higher the density, the longer the service life.

In accordance with the present invention, there are provided improved compositions which have improved green strengths and higher densities.

Accordingly, it is a principal object of the present invention to provide improved compositions comprising a particulate solid and a binder.

It is another object of the present invention to provide compositions comprising a particulate refractory solid and an organic binder which compositions have high green strengths and high densities.

It is another object of the present invention to provide improved tar-bonded refractory compositions.

Other objects of the present invention will in part be obvious and will in part appear hereinafter.

In accordance with the present invention it was discovered that when in producing tar-bonded refractory compositions comprising a particulate refractory solid and a binder, the binder comprises by weight between about 5 and about 60%, and preferably between about 10 and 50% pine tar and between about 40 and 95%, and preferably between about 50 and 90% of a heavy hydrocarbonaceous material, the resulting compositions possess unexpectedly high green strengths and densities both before and after coking.

Particulate refractory solids suitable for the purposes of the present invention are generally well known to the art and in any case are not critical. Typical solids that can be utilized are dolomite (CaO.MgO), lime (CaO), magnesia, chrome ore, silica and mixtures thereof. In addition, high melting point pitches and tars which can be ground to particulate form and handled as a powder and which do not substantially soften at temperatures below those at which the green composition will be produced, i.e. do not soften at temperatures from below about room temperature to about 400° F. depending upon compounding or blending temperatures in a given case, can be utilized in combination with other particulate solids. The average particle size of the solid utilized is not critical, sizes between about 44 microns and about ⅜ in. being normally entirely satisfactory. In addition as is well known, the solids utilized should be substantially free of moisture.

Any hydrocarbonaceous material which is liquid and has a viscosity at room temperature of at least about 8,000 cps. and preferably above about 10,000 cps., or hydrocarbonaceous materials which are solid at room temperature but which are liquid or semi-liquid at compounding or blending temperatures, i.e. at temperatures up to about 400° F., and which materials can be coked at elevated temperatures, i.e. at temperatures above about 600° F. and normally above about 1000° F., to yield at least about 20%, and preferably at least about 50% by weight thereof of carbon are normally suitable as a binder component for the purposes of the present invention. Typical hydrocarbonaceous materials suitable for the purposes of the present invention include coal tar pitch, petroleum pitch, low molecular weight polyethylenes and other polyolefins, asphaltenes, heavy fuel oils, for example, Bunker C, molasses, and many other materials and mixtures thereof which are obvious to one skilled in the art. Needless to say, hydrocarbonaceous materials which upon being coked yield undesirable or deleterious residues such as sulfur should be avoided. In particular, however, hydrocarbonaceous materials such as coal tar pitch, petroleum pitch, and asphaltenes are greatly preferred.

Pine tar is a complex mixture of twenty or more compounds and is derived from the destructive distillation of pine tree stumps and/or pine tree heart wood. Recent work in fractionating pine tar indicates that about 25% by weight of the pine tar consists of resin acids such as abietic, dehydroabietic, di-pimaric and iso-7-d-pimaric acids, and about 25% to 35% by weight consists of unidentified phenolics and polymeric phenolics. The remaining portion of the pine tar, about 40%, consists of neutral compounds (ketones, alcohols, hydrocarbons, etc.), none of which alone are present in very large amounts.

Broadly speaking, the present invention contemplates the term pine tar to mean the liquid product obtained from the destructive distillation of pine tree stumps and/or pine tree heart wood. However, in commercial practice the crude pine tar recovered after destructive distillation is often subjected to a refining operation and those fractions which have boiling points between about 120° C. and 355° C. or somewhat higher normally represent present commercial pine tars. The viscosity of the

TABLE I

| | Pine Tar Oil (PT-101) | Light Pine Tar (PT-400) | Medium Pine Tar (PT-600) | Heavy Pine Tar (PT-800) |
|---|---|---|---|---|
| Sp. Gr. at 15° C | 1.030–1.140 | 1.060–1.070 | 1.065–1.075 | 1.075–1.080 |
| Flash Point (open cup), ° F | 136 | 181 | 257 | 265 |
| Acidity (as acetic acid) percent max | 0.15 | 0.15 | 0.1 | 0.1 |
| Viscosity (Brookfield at 30° C.), cps | ¹ 98–141 | ² 500–900 | ² 1,700–2,650 | ² 3,350–7,400 |
| Acid No | 40–45 | 50–60 | 55–60 | 55–65 |
| Color | (³) | (³) | (³) | (³) |

¹ Spindle No. 1.
² Spindle No. 4.
³ Golden brown.

particular fraction will determine its designation as a light, medium or heavy pine tar. The dehydrated material which is removed at temperatures below about 120° C. is generally referred to as the "light ends" and is essentially terpenoid in nature. The present invention contemplates the use of crude pine tar and/or the above-mentioned refined fractions. The above table illustrates the properties of various commercially available pine tars produced by Cabot Corporation.

It is to be understood that resinous products of pine tree stumps and heart wood having properties somewhat similar to those enumerated above but obtained by way of solvent extraction processes or otherwise can oftentimes be used in the practice of our invention. Accordingly, it is intended that such products be included within the scope of the term "pine tar".

The total quantity of binder, i.e., comprising both the hydrocarbonaceous material and pine tar utilized in producing the improved tar-bonded refractories of the present invention is not critical bearing in mind of course that the green composition must have a consistency that renders it moldable to produce acceptable shaped articles. Normally, however, total binder concentrations between about 3% and 20%, and preferably between about 5% and 15%, by weight of the total green composition have been found to be suitable.

There follow a number of non-limiting illustrative examples:

*Example 1*

A composition comprising by weight about 24% —⅜+5 mesh dolomite, 24% —5+20 mesh dolomite, 9.8% —20 mesh dolomite, 37% periclase fines and 6% of a liquid coal tar pitch having a softening point of about 158° F. was produced by heating each of the ingredients to about 350° F. and then blending them together. Two 75 gram samples of the resulting composition were then pressed to brick form under 10,000 lbs. pressure in a conventional 2″ x 4″ x 12″ steel mold. One brick was not treated further but after 24 hours, was tested for compressive strength and the density thereof was measured. The other brick was coked in a graphite bed wherein the temperature was raised at the rate of 140° F./hr. until the temperature reached about 1800° F. at which temperature the bed was maintained for about 2.5 hours. The coked sample was then cooled and the density thereof was measured. The data obtained appears in Table I below.

*Example 2*

A composition was prepared which was a duplicate of the composition of Example 1 except that in place of said 6% of coal tar pitch, there was utilized in this example about 5.4% of said coal tar pitch and about 0.6% of PT–101 pine tar. Two 75 gram samples of the resulting composition were pressed into brick form as in Example 1 and the resulting bricks were treated and tested as in Example 1. The results are reported in Table II below.

*Example 3*

A composition is prepared which is a duplicate of the composition of Example 1 except that in place of said 6% of coal tar pitch, there is utilized in this example about 6% of a coal tar pitch having a softening point of about 250° F. Two 75 gram samples of the resulting composition are pressed into brick form as in Example 1 and the resulting bricks are treated and tested as in Example 1. The results are reported in Table II below.

*Example 4*

A composition is prepared which is a duplicate of the composition of Example 3 except that in place of said 6% of coal tar pitch there is utilized in this example about 5.4% of said pitch having a softening point of about 250° F. and 0.6% of PT–101 pine tar. Two 75 gram samples of the resulting composition are pressed into brick form as in Example 1 and the resulting bricks are treated and tested as in Example 1. The results are reported in Table II below.

TABLE II

| Sample From Example | Percent Total Binder | Percent Coal Tar Pitch | Percent Pine Tar | Treatment | Compressive Strength (p.s.i.) | Density |
| --- | --- | --- | --- | --- | --- | --- |
| 1 | 6 | 6.0 | 0 | Green | 272 | 1.51 |
| 1 | 6 | 6.0 | 0 | Coked | 137 | 1.42 |
| 2 | 6 | 5.4 | 0.6 | Green | 1,400 | 1.56 |
| 2 | 6 | 5.4 | 0.6 | Coked | 485 | 1.50 |
| 3 | 6 | 6.0 | 0 | Green | 0 | |
| 3 | 6 | 6.0 | 0 | Coked | 0 | |
| 4 | 6 | 5.4 | 0.6 | Green | 800 | 1.52 |
| 4 | 6 | 5.4 | 0.6 | Coked | 250 | 1.45 |

It will be noted by reference to Table II that equivalent compositions comprising an equivalent quantity of total binder but wherein the binder comprises pine tar possesses both higher compressive strengths and higher densities.

Obviously, many changes can be made in the above examples without departing from the scope of the present invention. For example, while for convenience only two different refractory solids were utilized in all of the above examples, any of the other solids mentioned heretofore would normally be entirely suitable for the purposes of the present invention.

Also, the refractory compositions of the present invention can contain any of the materials such as carbon black, for example, as disclosed is copending U.S. application Ser. No. 405,271, filed Oct. 20, 1964 by John F. Hardy et al., which can normally be added to tar-bonded refractory compositions. Thus, for example, the refractory compositions of the present invention can comprise furnace blacks, channel blacks, acetylene blacks and/or lamp blacks.

Accordingly, it is intended and it should be understood that the above disclosure is illustrative in nature and is not to be construed as limiting the scope of the present invention.

What we claim is:

1. A novel composition which consists essentially of 85 to 95% of a particulate refractory solid selected from the group consisting of dolomite, lime, magnesia, chrome ore, silica and mixtures thereof and 5 to 15% of a binder which is by weight between about 5 and about 60% pine tar and between about 40 and about 95% of a hydrocarbonaceous material selected from the group consisting of coal tar pitch, petroleum pitch, asphaltenes, solids convertible to a liquid state at temperatures below about 400° F., heavy oils of at least 8,000 cps. viscosity, and mixtures thereof.

2. The composition of claim 1 wherein said binder upon coking in the substantial absence of oxygen yields at least about 50% by weight thereof of carbon.

3. The composition of claim 1 wherein said binder comprises between about 10% and about 50% pine tar.

4. The composition of claim 1 wherein the pine tar utilized is produced by destructive distillation.

5. The composition of claim 1 wherein said hydrocarbonaceous material is chosen from the group consisting of coal tar pitch, petroleum pitch and asphaltenes.

6. The composition of claim 1 wherein said hydrocarbonaceous material is coal tar pitch.

7. A process for producing an improved refractory material which comprises molding a composition consisting essentially of 85% to 95% of a particulate refractory solid selected from the group consisting of dolomite, lime, magnesia, chrome ore, silica and mixtures thereof and 5 to 15% of a binder which is by weight between about 5 and about 60% pine tar and between about 40 and about 95% of a hydrocarbonaceous material selected from the group consisting of coal tar, pitch, petroleum pitch, asphaltenes, solids convertible to a liquid state at temperatures below about 400° F., heavy oils of at least 8,000 cps. viscosity, and mixtures thereof, and heating the molded article to temperatures above about 1000° F. in the substantial absence of oxygen.

8. The process of claim 7 wherein said binder upon coking yields at least about 50% by weight thereof of carbon.

9. The process of claim 7 wherein said binder comprises between about 10% and about 50% pine tar.

10. The process of claim 6 wherein said hydrocarbonaceous material is chosen from the group consisting of coal tar pitch, petroleum pitch and asphaltenes.

References Cited

UNITED STATES PATENTS

| | | | |
|---|---|---|---|
| 218,336 | 3/1879 | Thomas | 106—58 |
| 3,124,471 | 3/1964 | Spetzler et al. | 106—58 |

TOBIAS E. LEVOW, *Primary Examiner.*

J. E. POER, *Assistant Examiner.*